(12) United States Patent
Hochwald et al.

(10) Patent No.: US 8,259,672 B2
(45) Date of Patent: Sep. 4, 2012

(54) METHOD OF AIDING UPLINK BEAMFORMING TRANSMISSION

(75) Inventors: Bertrand Hochwald, Santa Clara, CA (US); Harold Artes, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 1163 days.

(21) Appl. No.: 12/074,186

(22) Filed: Feb. 29, 2008

(65) Prior Publication Data

US 2009/0190488 A1    Jul. 30, 2009

Related U.S. Application Data

(60) Provisional application No. 61/062,629, filed on Jan. 28, 2008.

(51) Int. Cl.
| | |
|---|---|
| H04W 4/00 | (2009.01) |
| H04B 7/14 | (2006.01) |
| H04B 7/185 | (2006.01) |
| H04B 7/00 | (2006.01) |
| H04B 1/38 | (2006.01) |
| H04J 1/10 | (2006.01) |
| H04J 3/08 | (2006.01) |
| H04M 1/00 | (2006.01) |
| H04L 12/28 | (2006.01) |

(52) U.S. Cl. ........ 370/331; 370/315; 370/328; 370/329; 370/332; 370/431; 455/13.1; 455/19; 455/513; 455/561; 455/522

(58) Field of Classification Search ................... 370/331
See application file for complete search history.

(56) References Cited

U.S. PATENT DOCUMENTS

| | | | |
|---|---|---|---|
| 2003/0012308 A1 | 1/2003 | Sampath et al. | |
| 2003/0076782 A1* | 4/2003 | Fortin et al. | 370/230.1 |
| 2003/0103477 A1* | 6/2003 | Doi et al. | 370/334 |
| 2007/0153922 A1 | 7/2007 | Dong et al. | |
| 2008/0008110 A1* | 1/2008 | Kishigami et al. | 370/310 |
| 2008/0037464 A1* | 2/2008 | Lim et al. | 370/329 |

* cited by examiner

*Primary Examiner* — Ian N Moore
*Assistant Examiner* — Jenee Alexander
(74) *Attorney, Agent, or Firm* — Sterne Kessler Goldstein & Fox PLLC (57) ABSTRACT

A method and apparatus of aiding uplink beamforming transmission is disclosed. One method includes a base station downlink transmitting beamformed signals to at least a first terminal, the beam formed signals directed and conveying data to at least the first terminal. The method further includes a second terminal eavesdropping the transmitted beamformed signals, and measuring a signal quality. The second terminal estimates uplink channel information based on the measured signal quality, for aiding uplink transmission. Based at least in part on the estimated transmission channel, the second terminal transmits beamformed uplink signals to the base station.

21 Claims, 7 Drawing Sheets

Orthogonal Frequency Division Multiple Access

METHOD OF AIDING UPLINK BEAMFORMING TRANSMISSION

CROSS-REFERENCE TO RELATED APPLICATION

This application claims the benefit of U.S. Provisional Application Patent Application No. 61/062,629 filed Jan. 28, 2008 which is incorporated by reference in its entirety herein.

FIELD OF THE DESCRIBED EMBODIMENTS

The described embodiments relate generally to wireless communications. More particularly, the described embodiments relate to a method and system of aiding uplink beamforming transmission.

BACKGROUND

Mobile WiMAX is a wireless platform being developed to provide wireless access that is able to deliver on demanding service requirements. With the added support for a variety of advanced multi-antenna implementations, Mobile WiMAX offers wireless access that meets growing network demands with higher performance, fewer sites, less spectrum, and reduced cost.

Multiple antenna techniques at the base station and end-user device, paired with sophisticated signal processing, can dramatically improve the communications link for the most demanding application scenarios including heavily obstructed propagation environments and high speed mobility service. Where conventional wireless network design has long used base site sectorization and single, omni-directional antennas at the end-user device to serve the communications link, with advanced multi-antenna implementations operators have a new techniques to develop the robust wireless networks.

Industry vendors and sources have created a host of naming conventions to refer to multi-antenna implementations. Simply put, the term MIMO (multiple input multiple output) can be used to reference any multi-antenna technologies. MIMO antenna systems are used in code division multiple access (CDMA) networks, time division multiplexing (TDM) networks, time division multiple access (TDMA) networks, orthogonal frequency division multiplexing (OFDM) networks, orthogonal frequency division multiple access (OFDMA) networks, and others. In order to maximize throughput, MIMO networks use a variety of channel estimation techniques to measure the transmission channel between a base stations of the wireless network and a mobile device. The channel estimation technique used depends on the wireless network type (i.e., CDMA, TDM/TDMA, OFDM/OFDMA).

Methods of estimating the transmission channels rely on pilots that occupy valuable time and frequency transmission space. That is, the typical methods require dedicated signaling overhead which requires bandwidth (time and/or frequency), and therefore, reduces system capacity.

Additionally, wireless networks that include mobile terminals (subscribers) have transmission channels that change frequently. Therefore, the transmission channels must be re-estimated or updated more frequently. As a result, wireless networks that include mobile terminals require even more capacity dedicated to channel estimations.

It is desirable to have a system and method for estimating and/or updating transmission channel information between a base station and a mobile terminal of a wireless network that can reduce the amount of time and frequency channel capacity required for the pilots.

SUMMARY

An embodiment includes a method of aiding uplink beamforming transmission. The method includes a base station downlink transmitting beamformed signals to at least a first terminal, the beam formed signals directed and conveying data to at least the first terminal. The method further includes a second terminal eavesdropping the transmitted beamformed signals, and measuring a signal quality. The second terminal estimates uplink channel information based on the measured signal quality, for aiding uplink transmission. Based at least in part on the estimated transmission channel, the second terminal transmits beamformed uplink signals to the base station.

Another embodiment includes another method of aiding uplink transmission. The method includes a base station downlink transmitting beamformed signals to a plurality of terminals. The beam formed signals are directed and convey data to each of the plurality of terminals. Each beamformed signal directed to each of the plurality of terminals are spatially orthogonal to the other beamformed signals directed to other terminals. The method further includes a second terminal eavesdropping the transmitted beamformed signals, and measuring a signal quality. The second terminal estimates uplink channel information based on the measured signal quality, for aiding uplink transmission. The second terminal uplink transmits beamformed uplink signals to the base station, wherein the beamformed uplink signals are formed at least in part based on the estimated uplink channel information.

Another embodiment includes another method of aiding uplink transmission. The method includes a terminal receiving downlink transmitted beamformed signals, and measuring a signal quality, wherein the downlink transmitting beamformed signals are transmitted from a base station to a plurality of terminals. The beam formed signals are directed and convey data to each of the plurality of terminals, and each beamformed signal directed to each of the plurality of terminals is spatially orthogonal to the other beamformed signals directed to other terminals. The method further includes the terminal estimating downlink channel information based on the measured signal quality. The terminal uplink transmits beamformed uplink signals to the base station, the beamformed uplink signals formed at least in part based on the estimated uplink channel information.

Other aspects and advantages of the present invention will become apparent from the following detailed description, taken in conjunction with the accompanying drawings, illustrating by way of example the principles of the invention.

DETAILED DESCRIPTION

Methods and apparatuses for updating transmission channel information based on eavesdropping of beamformed signals are disclosed. Terminals (subscribers) of a wireless network eaves-drop beam formed signals directed from a base station to other terminals. The eavesdropping terminals measure at least one signal quality of the eavesdropped signals. Based upon the measured signal qualities, estimates of a transmission channel between the base station and the eavesdropping terminal can be generated and/or updated. Additionally, for some systems (for example, a time division duplex (TDD) wireless system) the eavesdropping terminal can select uplink sounding conditions based on the measured signal qualities.

It is to be understood that for the descriptions of the embodiments, the term "eavesdropping" is not intended to be a derogatory term. A terminal that is eavesdropping, is receiving data and/or pilot signals that are directed (generally, through beamforming) to a different terminal. In the described embodiments, an eavesdropping terminal acts benignly and is not necessarily interested in the decoding the scheduled data intended for another terminal. The eavesdropping terminal instead takes advantage of a situation that includes a base station transmitting signals to other terminals, to learn, obtain, or estimate information about a transmission channel between the base station and itself. This information can be fed back to the base station, enabling the base station to improve channel estimations to the eavesdropping terminal. This information can alternatively or additionally be used by the eavesdropping terminal to make or improve uplink channel estimations between the eavesdropping terminal and the base station. The intention is that the eavesdropping terminal is scheduled at another time for data transmission or reception based on the channel information obtained during eavesdropping. At that point, the original terminals receiving data can become eavesdroppers, and so on.

Figure 1:
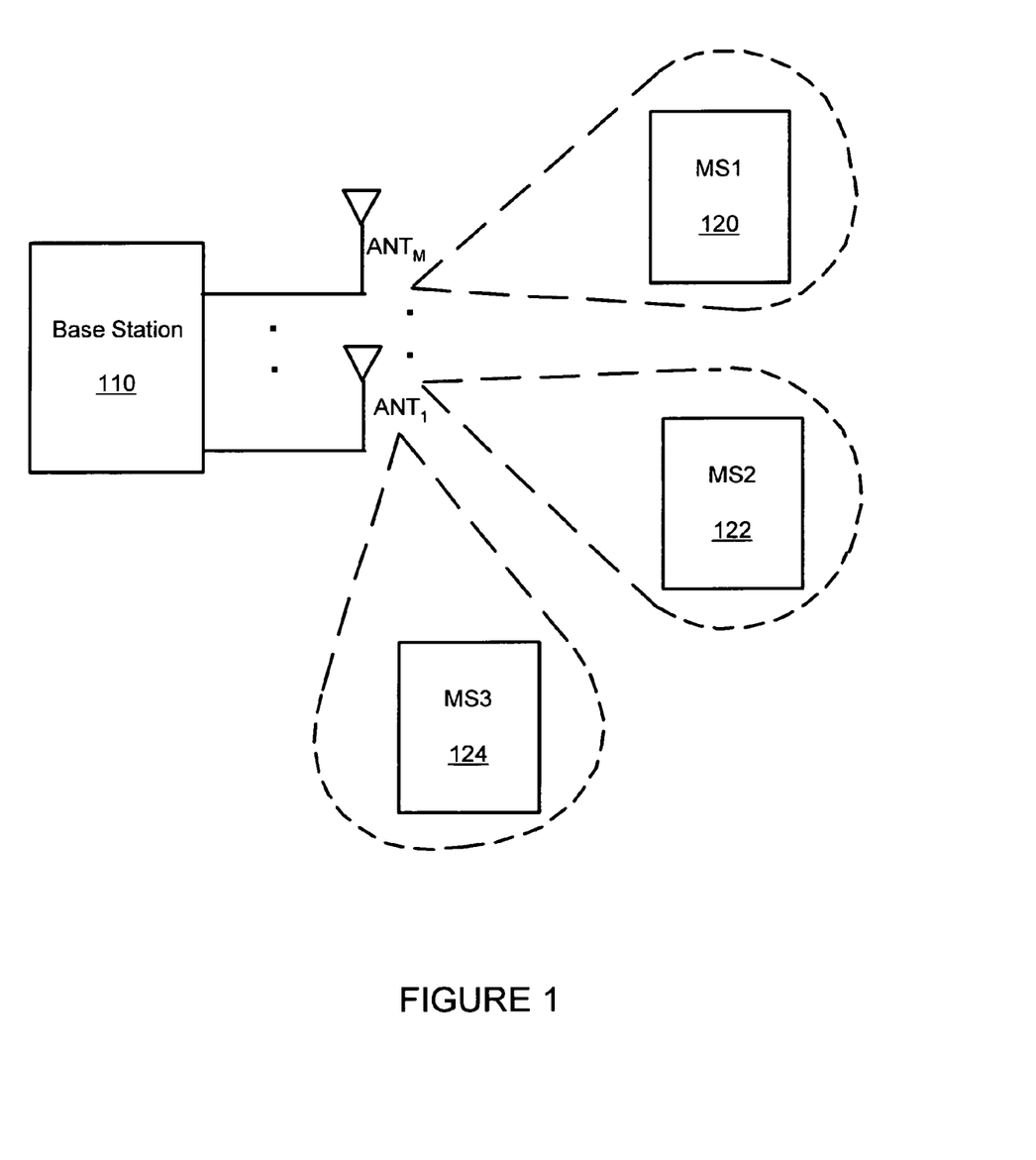
FIG. 1 shows an example of a base station transmitting beamformed signals to multiple user devices.

FIG. 1 shows an example of a base station 110 transmitting beamformed signals to multiple user devices 120, 122, 124. The base station 110 and user devices 120, 122, 124 can be a part of a wireless network, for example, a WiMax wireless network. To capitalize on the performance advantages offered by MIMO wireless systems, the wireless network can include MIMO communication diversity, MIMO spatial multiplexing and/or beamforming.

MIMO communication diversity includes a single data stream being replicated and transmitted over multiple antennas. For example, the redundant data streams can each be encoded using a mathematical algorithm known as Space Time Block Codes. With this example of coding, each transmitted signal is orthogonal to the rest reducing self-interference and improving the capability of the receiver to distinguish between the multiple signals. With the multiple transmissions of the coded data stream, there is increased opportunity for the receiver to identify a strong signal that is less adversely affected by the physical path. The receiver additionally can use, for example, Maximal-Ratio Combining (MRC) techniques to combine the multiple signals for more robust reception. MIMO communication diversity is fundamentally used to enhance system coverage.

MIMO spatial multiplexing includes the signal to be transmitted being split into multiple data streams and each data stream is transmitted from a different base station transmit antenna operating in the same time-frequency resource allocated for the receiver. In the presence of a multipath environment, the multiple signals arrive at the receiver antenna array with sufficiently different spatial signatures allowing the receiver to readily discern the multiple data streams. Spatial multiplexing provides a very capable means for increasing the channel capacity.

Wireless networks can also include adaptive mode selection between MIMO communication diversity and MIMO spatial multiplexing. In environments where the Signal to Noise Ratio (SNR) is low, such as the edge of the cell or where the signal is weak, MIMO communication diversity may outperform MIMO spatial multiplexing. At higher SNR, where the system is more prone to be bandwidth limited rather than signal strength limited, MIMO spatial multiplexing may outperform MIMO communication diversity. An ideal WiMAX system employing MIMO techniques supports both. The system calculates an optimal switching point and dynamically shift between the two approaches to offer the necessary coverage or capacity gains demanded from the network at any given time or location.

Wireless network systems, such as, WiMAX systems, can also use beamforming as a means to further increase system coverage and capacity can surpass the capabilities of MIMO techniques. Beamforming techniques such as Statistical Eigen Beamforming (EBF) and Maximum Ratio Transmission (MRT) are optional features in the 802.16e WiMAX standard, but some vendors are taking advantage of its strong performance characteristics.

Beamforming techniques leverage arrays of transmit and receive antennas to control the directionality and shape of the radiation pattern. The antenna elements have spatial separation dictated by the wavelength of transmission and are supported by signal processing.

Channel information can be communicated from the WiMAX subscriber to the WiMAX base station using the uplink sounding response. Based on the understanding of the channel characteristics, the WiMAX base station utilizes signal processing techniques to calculate weights to be assigned to each transmitter controlling the phase and relative amplitude of the signals. By leveraging constructive and destructive interference, the radiation pattern is steered and formed to provide an optimal radiation pattern focused in the direction of communication.

When transmitting a signal, beamforming can increase the power in the direction the signal is to be sent. When receiving a signal, beamforming can increase the receiver sensitivity in the direction of the wanted signals and decrease the sensitivity in the direction of interference and noise.

Beamforming techniques allow the WiMAX system to realize increased range with higher antenna gain in the desired direction of communications and better connectivity between the base station and device. Simultaneously, the narrower beamwidth and reduced interference increases the capacity and throughput offered by the system.

Estimated transmission channel information is needed for proper selection between beamforming and/or spatial multiplexing transmission. As previously described, the channel information for mobile networks changes more rapidly than for static networks, and therefore, the channel information needs to be updated more frequently.

In OFDM-MIMO systems, training sequence design as well as efficient channel estimation algorithm remains a challenge if different training sequence signals are transmitted from different antennas simultaneously. Several approaches based on training tones have been attempted in prior art systems. Other known solutions of a time orthogonal preamble scheme can be implemented, but typically increase the overhead.

Figure 2:
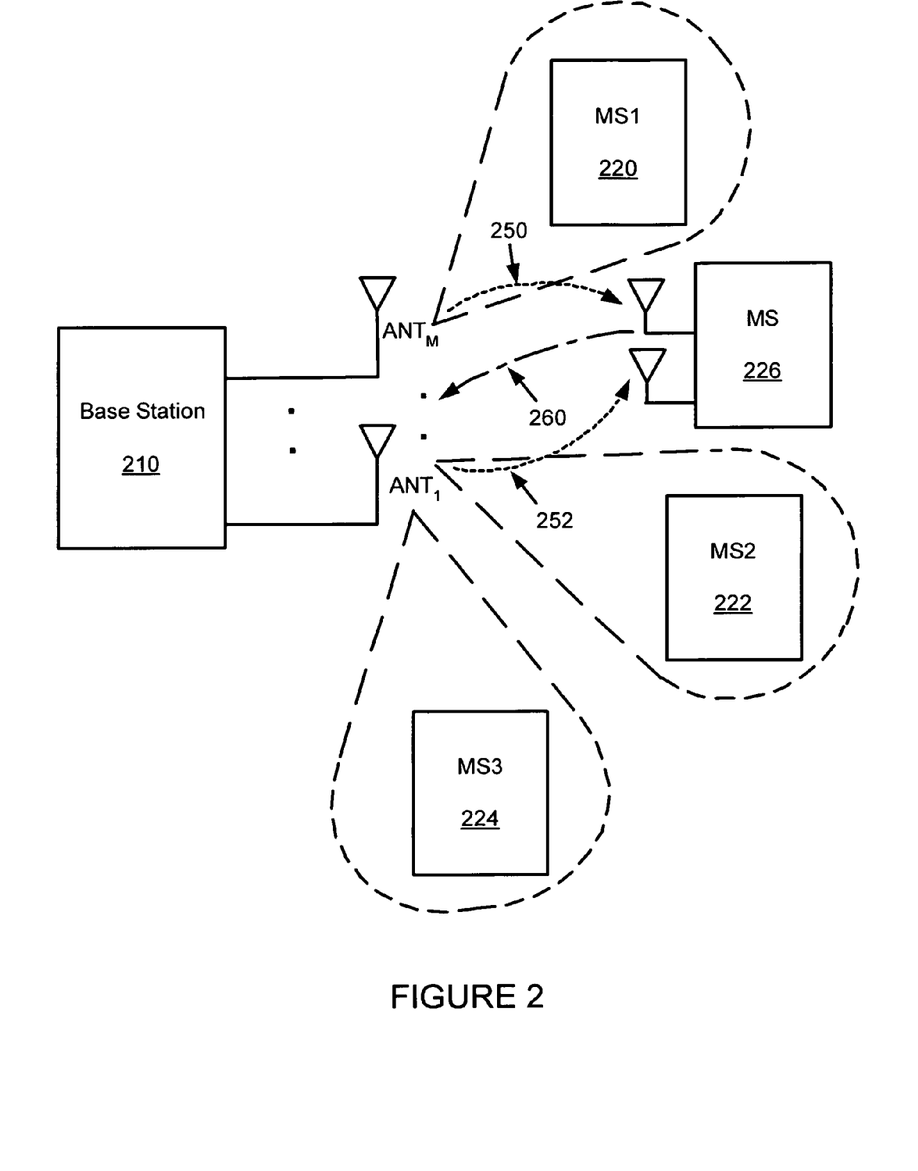
FIG. 2 shows an example of a base station transmitting beamformed signals to multiple user devices, and an eavesdropping user receiving at least some of the beamformed signals.

FIG. 2 shows an example of a base station 210 transmitting beamformed signals to multiple user devices 220, 222, 224, and a second terminal 226 receiving at least some of the beamformed signals. For this example, the beamformed signals are intended for the user devices 220, 222, 224. That is, the beamformed signals are directed to the multiple user devices 220, 222, 224, but not directed to the second terminal 226. For an embodiment, each beamformed signal for each user device is formed to be orthogonal to the beamformed signals for the other devices.

As shown, the second terminal 226 eaves-drops the beamformed signals (as shown by arrows 250, 252) that are directed to the other user devices 220, 222, 224. The base station 210 uses channel information between the base station 210 and the user devices 220, 222, 224 to form the beams. Based on knowledge of signal quality of signals eavesdropped by the second terminal 226, the base station 210 can obtain some information about a transmission channel between the base station 210 and the second terminal 226. The base station 210 can obtain the signal quality from uplink transmission (shown by arrow 260) from the second terminal 226. That is, the second terminal measures the signal quality of the beamformed signals and feeds the signal quality measurements back to the base station 210. The base station can use this information to estimate the channel between the base station 210 and the second terminal 226, or supplement prior estimates of the channel between the base station 210 and the second terminal 226.

The base station 210 transmits beamformed signals to multiple user devices. That is, the base station 210 transmits multiple access signals that are received by multiple terminals, and that can be defined by at least frequency and time slots. As will be described, the multiple beam formed signals allocated to different users can also be spatially orthogonal, and/or include cyclic delay diversity. The signal quality measurements of the eavesdropped signals need to have an identifier that allows the base station 210 to identify which beamformed signals transmitted by the base station 210 are being eavesdropped, and resulted in the signal quality measurement.

One method of transmitting wireless signal, such as wireless transmission according to the WiMax protocol, includes multi-carrier symbols (such as OFDM) organized according to downlink and uplink frames. The frames include frequency carriers and time slots that can be used to identify the beamformed signals.

Figure 3:
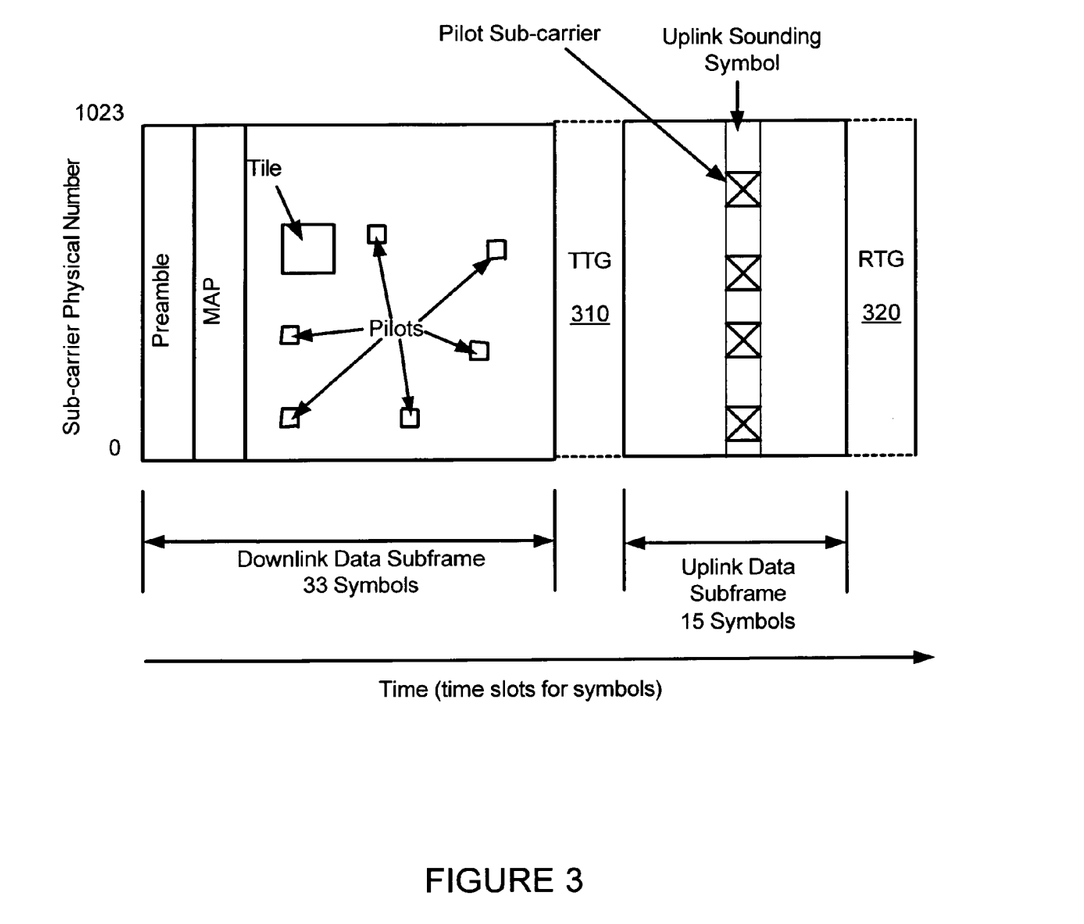
FIG. 3 shows an example of downlink and uplink frame that can be used for scheduled wireless communications.

FIG. 3 shows an example of downlink and uplink frame that can be used for scheduled wireless communications. The downlink frame and the uplink frame include sub-carriers (1024 sub-carriers are shown in FIG. 3) and time slots for OFDM symbols (33+15=48 symbols are shown in FIG. 3). The downlink frame includes a preamble and a MAP. A particular carrier frequency and a particular symbol can used to identify a tile within the downlink and/or uplink frames. The downlink includes pilot tones that are typically used to characterize a downlink channel between a base station and mobile terminal.

The uplink frame includes uplink sounding symbols (also referred to as pilot sub-carriers) that can be used to characterize an uplink channel between the mobile terminal and the base station. Guards TTG 310 and RTG 320 are included between the downlink and uplink frames.

The MAP includes a schedule of the downlink and uplink transmission. Based on the MAP, the mobile terminals can identify tile in which data and pilots are located. The MAP includes the previously discussed identifying information.

Figure 4:
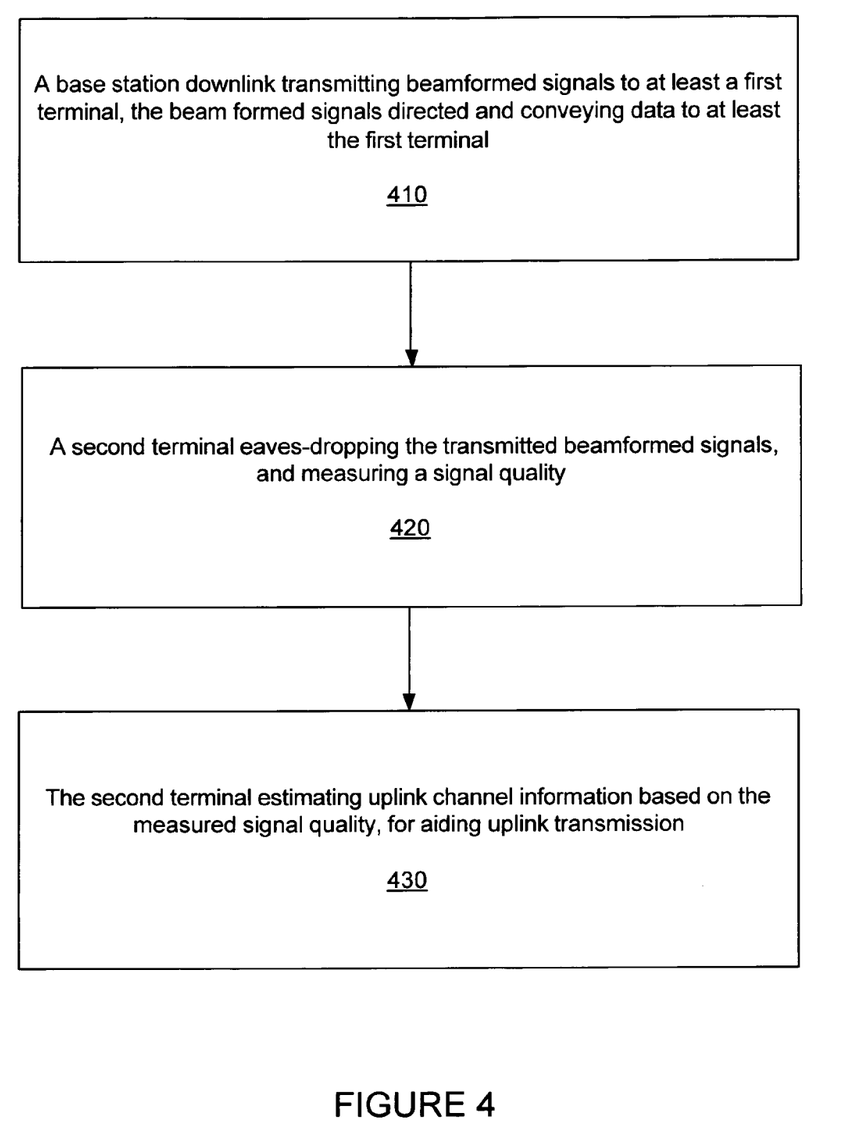
FIG. 4 shows a flow chart that includes steps of one example of a method of aiding uplink beamforming transmission.

FIG. 4 shows a flow chart that includes steps of one example of a method of aiding uplink beamforming transmission. A first step 410 includes a base station downlink transmitting beamformed signals to at least a first terminal, the beam formed signals directed and conveying data to at least the first terminal. A second step 420 includes a second terminal eavesdropping the transmitted beamformed signals, and measuring a signal quality. The eavesdropped beamformed signals are not directed to the second terminal. A third step 430 includes the second terminal estimating uplink channel information based on the measured signal quality, for aiding uplink transmission.

The uplink channel information is used by the second terminal to aid uplink transmission to the base station. More specifically, the second terminal transmits beamformed signals to the base station, wherein the beamformed uplink signals are formed at least in part based on the uplink channel information.

Based on the estimated transmission channel information, the second terminal creates or updates channel information between the second terminal and the base station based on the measured signal quality, and the transmission identifier. That is, if the second terminal does not presently have information regarding the transmission channel between the second terminal and the base station, the second terminal can create the transmission channel information based on the measured signal quality. If the second terminal does have information regarding the transmission channel, then the second terminal can update the existing channel information based on the measured signal quality.

The beamformed signals can be data or pilot signals. That is, both data signals and pilot signals can be transmitted as beamformed signals. Therefore, it is possible for the eavesdropping terminal to measure the signal quality of, and identify both data and pilot signals.

As described, the base station can transmit beam formed signals to multiple terminals. Therefore, the second terminal can receive the transmitted beamformed signals intended for multiple different terminals. The transmitted beamformed signals are directed to one or more of the multiple terminals, but are not directed to the second terminal. The second (eavesdropping) terminal can measure corresponding signal qualities, and identify which other terminal the beamformed signals were directed to.

The second terminal estimates the uplink channel based at least in part on reception (eavesdropping) of downlink transmitted signals. Therefore, the second terminal establishes a relationship between an uplink channel associated with the uplink channel information, and a corresponding downlink channel. This relationship can generally be established if the communication between the base station and the second terminal is time domain duplex (TDD) transmission. For TDD transmission, the uplink and downlink channels can be assumed to be approximately the same assuming the channel to be reciprocal. The downlink transmission of the base station and uplink transmission of the second terminal occur at different times for TDD transmission.

The beamformed signals eavesdropped by the second terminal can be intended for multiple other terminals. Additionally, each beamformed signal directed to each of the plurality of terminals can be spatially orthogonal to the other beamformed signals directed to other terminals.

For one embodiment, the second terminal identifies beamformed signals that have a quality above a threshold. For another embodiment, the second terminal identifies beamformed signals having a quality below a threshold. The beamformed signals can be identified as described.

An embodiment includes the second (eavesdropping) terminal measuring signal qualities of eavesdropped signals, but also identifying channels for transmitting uplink sounding based on the measured signal quality, of the beamformed signals.

For MIMO transmission, the second (eavesdropping) terminal can include multiple antennas, and include the second terminal receiving the transmitted beamformed signals over multiple receive antennas, and measuring a joint signal quality indicator. The joint signal quality indicator can include measured signal qualities of multiple beams at the multiple receive antennas. Based on the joint signal quality indicator, the second terminal can determine whether the second terminal is to transmit in the uplink in a beamforming mode or a spatial multiplexing mode based on the joint signal quality indicator.

For an embodiment, the joint signal quality indicator includes a signal quality difference between the multiple receive antennas. If the signal quality difference between the multiple antennas varies by greater than a threshold, then the second terminal selects spatial multiplexing for transmission to the base station. If the measured signal quality between the multiple receive antennas varies by less than a threshold, then the second terminal selects beamforming for transmission to the base station.

An embodiment includes the base station cyclic-delaying the transmitted beamformed signals. This embodiment additionally includes the second terminal selecting frequency sub-carriers of the cyclic-delayed transmitted beamformed signals for reception and signal quality measurement, based on a frequency dependency of the frequency sub-carriers of the cyclic-delayed transmitted beamformed signals.

Figure 5:
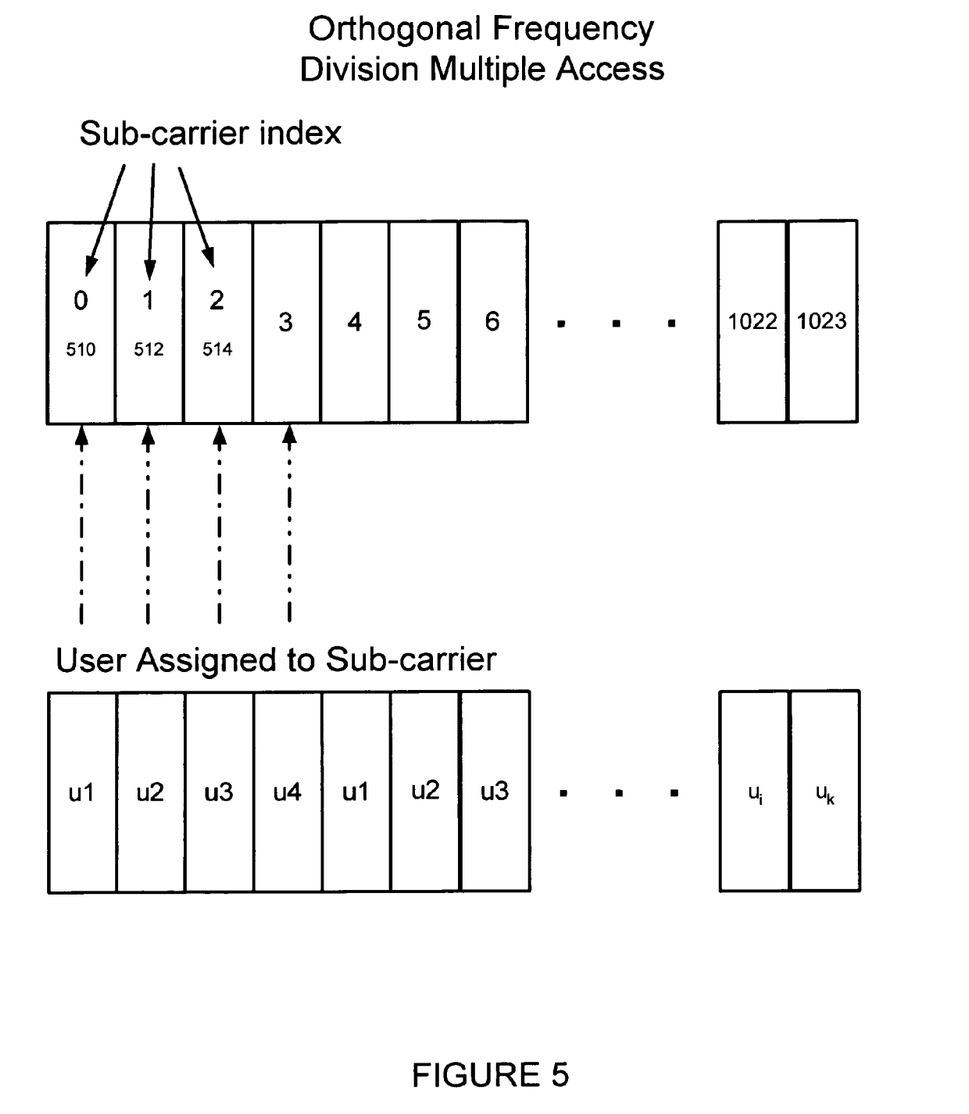
FIG. 5 is a flow chart that includes steps of one other example of a method aiding uplink beamforming transmission.

FIG. 5 shows a frequency spectrum of a downlink multi-carrier signal in which different sub-carriers of the multi-carrier signal are allocated to different terminals, and the downlink multi-carrier signal includes cyclic delay diversity. As shown, a first sub-carrier 510 is allocated to a first user U0, a second sub-carrier 512 is allocated to a second user U1, a third sub-carrier 514 is allocated to a third user U2 and a fourth sub-carrier is allocated to a fourth user U3.

An embodiment includes beamforming each sub-carrier of a multi-carrier OFDMA symbol directed to the terminals. The terminals may be assigned randomly or in specific patterns to subcarriers. Generally, M transmit antennas of the base station can support K terminals with spatially orthogonal beams $q_1, \ldots, q_K$, in which $K \leq M$. A terminal k can be assigned to subcarrier k with beam $q_k$ for $k=1, \ldots K$. Because the subcarriers in an OFDMA system are generally closely-spaced, it can be assumed that an eavesdropper has a frequency-flat channel response from the M basestation antennas to its receive antennas. This means that the channel does not vary significantly across the K subcarriers.

Assume in this example that the terminal has N receive antennas. Then the signal received by the eavesdropper on frequency k becomes:

$$y(k) = P \cdot G q_k \cdot d_k + n(k)$$

where:

G represents the N×M frequency-flat channel between the basestation and the eavesdropper, $q_k$ represents the beam sent to terminal k, with $\|q_k\|=1$ (unit-norm beam), $d_k$ represents the data or pilot signal sent to terminal k, $n(k)$ is additive receiver noise at the eavesdropper, P represents the transmission power of the basestation across all antennas.

Arranging the K measurements taken by the eavesdropper into an N×K matrix yields:

$$Y = GQ + n$$

where $Q=[q_1 \ldots q_K]$ is the M×K matrix of all the K terminal beams. This gives the eavesdropper an estimate of the product of G and Q. In a TDD system, the uplink channel of the eavesdropper is $G^T$ where the superscript "T" denotes transpose. Since the eavesdropper has an estimate of GQ [or equivalently $(GQ)^T$] it may form the singular value decomposition $$(GQ)^T = TRW^*$$

where T is a K×K unitary matrix, R is a K×N diagonal matrix with positive diagonal values, and W is an N×N unitary matrix, and where the superscript "*" denotes conjugate-transpose.

The eavesdropper then uses its N transmit antennas with the columns of W as beamforming vectors on the uplink. The basestation knows Q and can perform optimum processing of this received beamformed signal.

This embodiment is most effective if Q is a unitary (also sometimes called "orthogonal") matrix, meaning that the constituent beams are orthogonal to one another.

One possible way for the basestation to achieve orthogonality includes the basestation arranging the channel information for the intended beamformed K terminals into a matrix:

$$H = \begin{bmatrix} h_1^* \\ \vdots \\ h_K^* \end{bmatrix}$$

where $h_1^*, \ldots h_K^*$ represent the 1×M channels between the basestation and the K terminals. The matrix H therefore has dimension K×M. Rather than using the standard well-known unit-energy beams $q_k = h_k / \|h_k\|$ (which are not guaranteed to be orthogonal), the basestation forms the singular value decomposition:

$$H = USV^*$$

where U is a K×K unitary matrix, S is a K×K diagonal matrix with positive diagonal entries, and V* is an K×M matrix such that V*V=I (the identity matrix). The basestation then forms:

$$Q = VU^*$$

and chooses the K columns of Q as the unit-energy beams, one for each of the K terminals.

For the description here, Q can be referred to as an orthogonal set, and its columns can be used to generate spatially orthogonal beams. An embodiment includes the base station forming orthogonal beamformed signals by estimating a channel matrix, computing a singular value decomposition of the estimated channel matrix, computing an orthogonal set from the singular value decomposition, and generating spatially orthogonal beams by selecting columns of the orthogonal set.

Another way for a basestation to achieve orthogonality includes the basestation transmitting a combination of beamforming and cyclic-delay diversity, where the transmitted beam to the kth terminal is written as:

$$q_k(f) = \begin{bmatrix} q_{1k} \\ q_{2k} e^{2\pi j \tau_2 f} \\ \vdots \\ q_{Mk} e^{2\pi j \tau_M f} \end{bmatrix}$$

This beam has frequency-dependence given by the cyclic-delay parameters $\tau_2, \ldots \tau_M$, which generally have units of seconds. (adopting the convention that $\tau_1=0$.) The basestation may choose $|q_{1k}|=|q_{2k}|=\ldots |q_{Mk}|$ and the eavesdropping terminal can then generally find $f_1$ and $f_2$ such that $$q_k^*(f_1)q_k(f_2)=0.$$

Therefore, the beams to terminal k are orthogonal at two different frequencies. With proper choice of the cyclic-delay parameters, the eavesdropper can find $f_1, \ldots f_M$ such that $q_k(f_1), \ldots q_k(f_M)$ are all orthogonal. Thus, the eavesdropper can use the beams at these frequencies for channel estimation.

Figure 6:
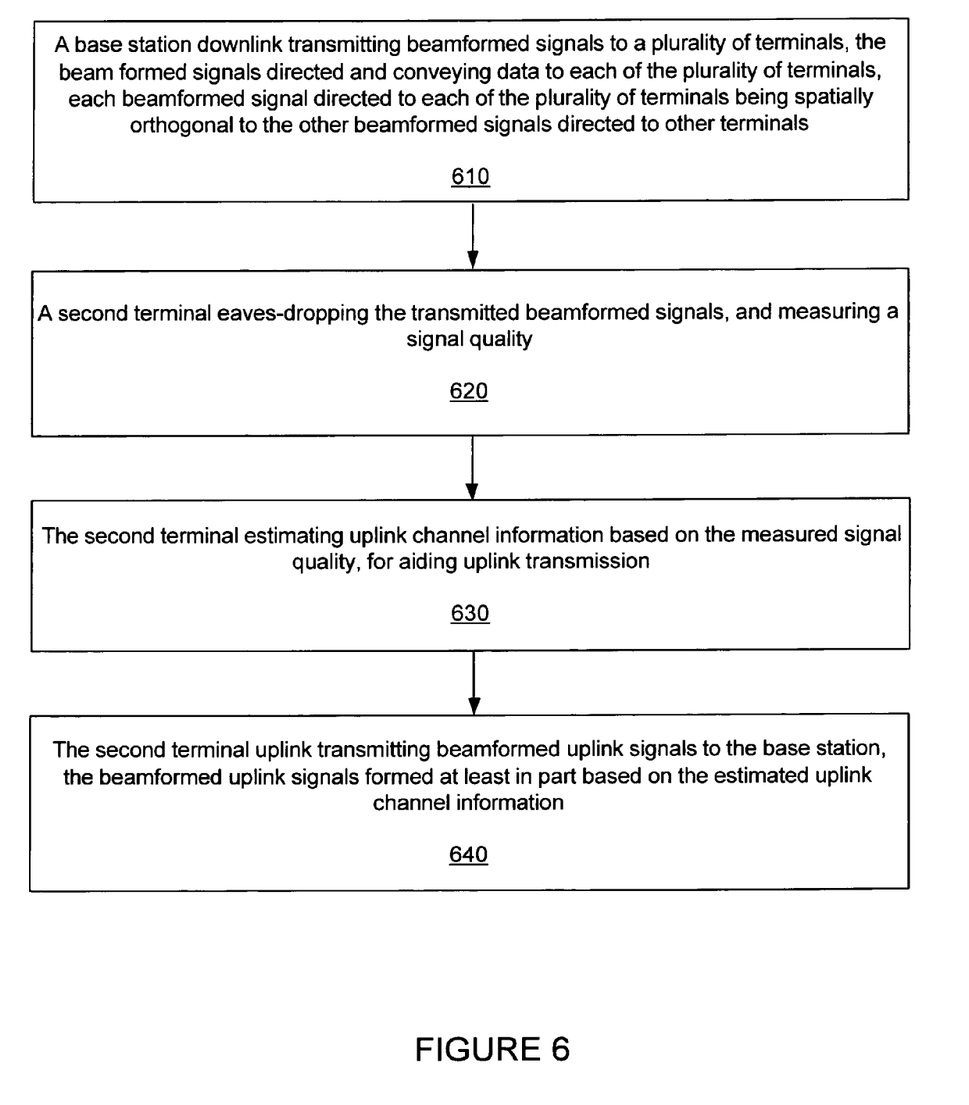
FIG. 6 is a flow chart that includes steps of an example of a method of aiding uplink transmission.

FIG. 6 is a flow chart that includes steps of another example of a method of aiding uplink transmission. A first step 610 includes a base station downlink transmitting beamformed signals to a plurality of terminals, the beam formed signals directed and conveying data to each of the plurality of terminals, each beamformed signal directed to each of the plurality of terminals being spatially orthogonal to the other beamformed signals directed to other terminals. A second step 620 includes a second terminal eavesdropping the transmitted beamformed signals, and measuring a signal quality. A third step 630 includes the second terminal estimating uplink channel information based on the measured signal quality, for aiding uplink transmission. A fourth step 640 includes the second terminal uplink transmitting beamformed uplink signals to the base station, the beamformed uplink signals formed at least in part based on the estimated uplink channel information.

As previously described, an embodiment includes the base station cyclic-delaying the transmitted beamformed signals. A specific embodiment additionally includes the second terminal selecting frequency sub-carriers of the cyclic-delayed transmitted beamformed signals for reception and signal quality measurement, based on a frequency dependency of the frequency sub-carriers of the cyclic-delayed transmitted beamformed signals.

An embodiment includes the second (eavesdropping) terminal augmenting selection of sounding symbols for uplink sounding based on the uplink channel information. More specifically, and embodiment includes sounding symbols being selected only on frequency carriers in which beamformed signals can be received from the base station having a predetermined signal quality.

Figure 7:
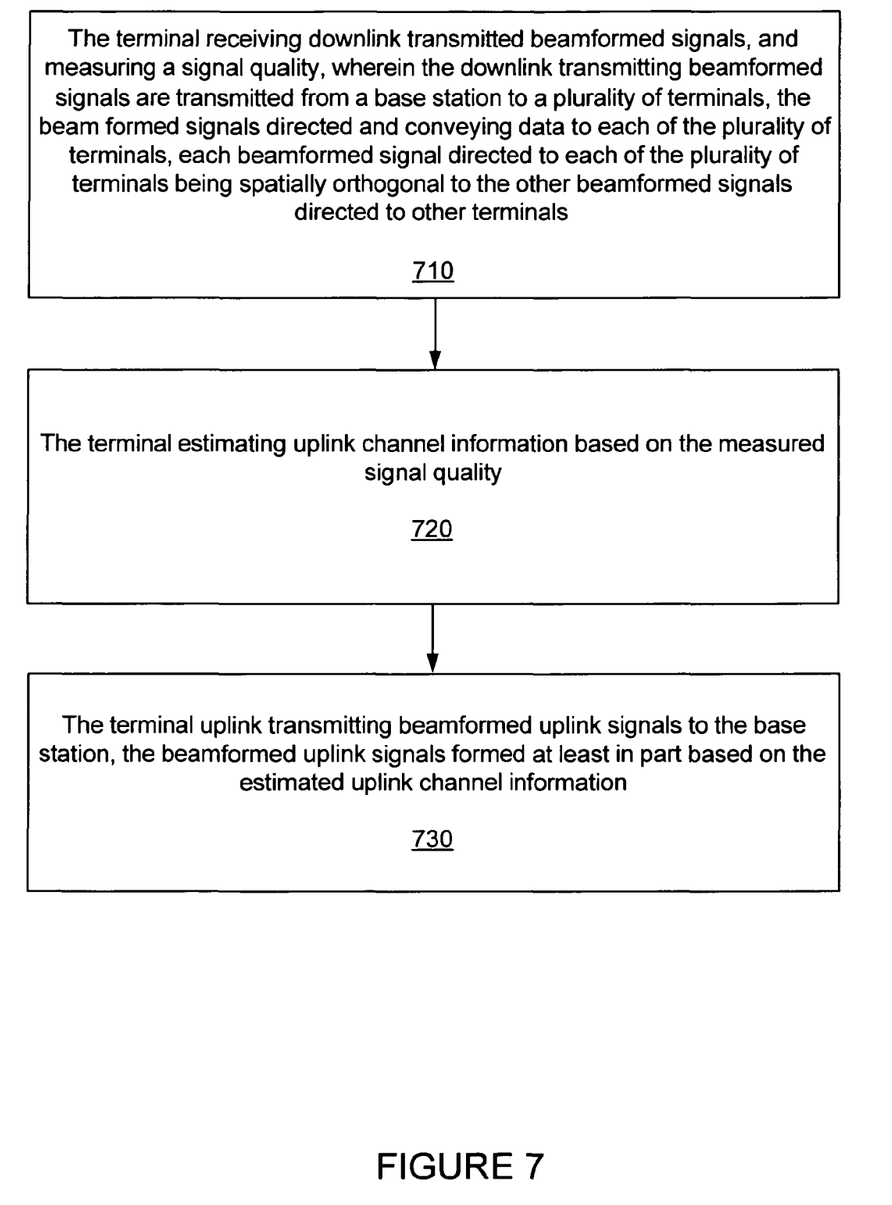
FIG. 7 is a flow chart that includes steps of another example of a method of aiding uplink transmission.

FIG. 7 is a flow chart that includes steps of another example of a method of aiding uplink transmission. A first step 710 includes the terminal receiving downlink transmitted beamformed signals, and measuring a signal quality, wherein the downlink transmitting beamformed signals are transmitted from a base station to a plurality of terminals, the beam formed signals directed and conveying data to each of the plurality of terminals, each beamformed signal directed to each of the plurality of terminals being spatially orthogonal to the other beamformed signals directed to other terminals. A second step 720 includes the terminal estimating uplink channel information based on the measured signal quality. A third step 730 includes the terminal uplink transmitting beamformed uplink signals to the base station, the beamformed uplink signals formed at least in part based on the estimated uplink channel information.

Although specific embodiments of the invention have been described and illustrated, the invention is not to be limited to the specific forms or arrangements of parts so described and illustrated. The invention is limited only by the appended claims.

What is claimed is:

1. A method of aiding uplink transmission, comprising:
   eavesdropping, by a second terminal, on beamformed signals transmitted on a downlink from a base station to at least a first terminal, and measuring a signal quality of the transmitted beamformed signals;
   receiving, by the second terminal, the transmitted beamformed signals over multiple receive antennas and measuring a joint signal quality indicator, wherein the joint signal quality indicator includes a signal quality difference between the multiple receive antennas; and
   estimating, by the second terminal, uplink channel information based on the measured signal quality for aiding uplink transmission, and
   selecting spatial multiplexing for transmission to the base station if the signal quality difference between the multiple antennas varies by greater than a threshold.

2. The method of claim 1, further comprising establishing a relationship between an uplink channel associated with the uplink channel information and a corresponding downlink channel.

3. The method of claim 1 wherein downlink transmission of the base station and uplink transmission of the second terminal occur at different times.

4. The method of claim 1, wherein the beamformed signals comprise pilots.

5. The method of claim 1, further comprising the second terminal creating or updating channel information between the second terminal and the base station based on the uplink channel information.

6. The method of claim 1, further comprising the second terminal updating at least one beam that is formed to aid transmission between the second terminal and the base station based on the uplink channel information.

7. The method of claim 1, further comprising the base station transmitting beamformed signals to a plurality of terminals, and the second terminal receiving the transmitted beamformed signals, and measuring corresponding signal qualities.

8. The method of claim 1, further comprising the second terminal identifying beam formed signals that have a quality of at least one of above a threshold, or below a threshold.

9. The method of claim 1, further comprising the second terminal identifying channels for transmitting uplink sounding based on the measured signal quality of the beamformed signals.

10. The method of claim 1, further comprising the second terminal selecting beamforming for transmission to the base station if the signal quality difference between the multiple antennas varies by less than the threshold.

11. The method of claim 10, further comprising:
    the second terminal uplink transmitting beamformed uplink signals to the base station, the beamformed uplink signals formed at least in part based on the uplink channel information.

12. The method of claim 10, further comprising the base station determining whether to transmit in a spatial multiplexing mode based on a joint signal quality indicator, wherein the joint signal quality indicator comprises measured signal qualities of multiple beams at the multiple receive antennas.

13. The method of claim 1, further comprising the base station cyclic-delaying the transmitted beamformed signals.

14. The method of claim 13, further comprising the second terminal selecting frequency sub-carriers of the cyclic-delayed transmitted beamformed signals for reception and signal quality measurement, based on a frequency dependency of the frequency sub-carriers of the cyclic-delayed transmitted beamformed signals.

15. The method of claim 1, wherein the base station forms the beamformed signals to be spatially orthogonal, comprising:
   estimating a channel matrix;
   computing a singular value decomposition of the estimated channel matrix;
   computing an orthogonal set from the singular value decomposition;
   the base station generating the spatially orthogonal beams by selecting columns of the orthogonal set.

16. A method of aiding uplink transmission, comprising:
   eavesdropping, by a second terminal, on beamformed signals transmitted on a downlink from a base station to a plurality of terminals, and measuring a signal quality of the transmitted beamformed signals, the beamformed signals directed and conveying data to each of the plurality of terminals, each beamformed signal directed to each of the plurality of terminals being spatially orthogonal to the other beamformed signals directed to other terminals;
   receiving, by the second terminal, the transmitted beamformed signals over multiple receive antennas and measuring a joint signal quality indicator, wherein the joint signal quality indicator includes a signal quality difference between the multiple receive antennas;
   estimating, by the second terminal, uplink channel information based on the measured signal quality for aiding uplink transmission, and selecting beamforming for transmission to the base station if the signal quality difference between the multiple antennas varies by less than a threshold; and
   the second terminal uplink transmitting beamformed uplink signals to the base station, the beamformed uplink signals formed at least in part based on the estimated uplink channel information.

17. The method of claim 16, wherein the base station forms the beamformed signals to be spatially orthogonal, comprising:
   estimating a channel matrix;
   computing a singular value decomposition of the estimated channel matrix;
   computing an orthogonal set from the singular value decomposition;
   the base station generating the spatially orthogonal beams by selecting columns of the orthogonal set.

18. The method of claim 16, further comprising the base station cyclic-delaying the transmitted beamformed signals.

19. The method of claim 18, further comprising the second terminal selecting frequency sub-carriers of the cyclic-delayed transmitted beamformed signals for reception and signal quality measurement, based on a frequency dependency of the frequency sub-carriers of the cyclic-delayed transmitted beamformed signals.

20. The method of claim 18, further comprising augmenting selection of sounding symbols for uplink sounding based on the uplink channel information.

21. The method of claim 20, wherein sounding symbols are selected only on frequency carriers in which beamformed signals can be received from the base station having a predetermined signal quality.

* * * * *

UNITED STATES PATENT AND TRADEMARK OFFICE
CERTIFICATE OF CORRECTION

PATENT NO. : 8,259,672 B2   Page 1 of 1
APPLICATION NO. : 12/074186
DATED : September 4, 2012
INVENTOR(S) : Hochwald et al.

It is certified that error appears in the above-identified patent and that said Letters Patent is hereby corrected as shown below:

In column 10, line 50, replace "beam formed" with -- beamformed --
In column 12, line 3, replace "beamforminq" with -- beamforming --

Signed and Sealed this
Eighteenth Day of December, 2012

David J. Kappos
*Director of the United States Patent and Trademark Office*